United States Patent [19]

Wang et al.

[11] Patent Number: 5,656,704

[45] Date of Patent: Aug. 12, 1997

[54] HIGHLY SYNDIOTACTIC PMMA POLYMERS

[75] Inventors: Jinshan Wang, Pittsburgh, Pa.; Philippe Teyssie, Neuville en Condroz, Belgium; Philippe Heim; Bruno Vuillemin, both of Pau, France

[73] Assignee: Elf Atochem S.A., Puteaux, France

[21] Appl. No.: 466,126

[22] Filed: Jun. 6, 1995

[30] Foreign Application Priority Data

Jun. 6, 1994 [FR] France ................................ 94 06891

[51] Int. Cl.$^6$ .............................. C08F 4/52; C08F 4/46; C08F 120/14
[52] U.S. Cl. ..................... 526/187; 526/189; 526/329.7
[58] Field of Search .................................. 526/187, 189, 526/329.7

[56] References Cited

U.S. PATENT DOCUMENTS 5,328,970  7/1994  Inoue et al. .............................. 526/161

Primary Examiner—Joseph L. Schofer
Assistant Examiner—Wu C. Cheng
Attorney, Agent, or Firm—Burns, Doane, Swecker & Mathis, L.L.P.

[57] ABSTRACT

Mechanically strong, heat-resistant and transparent PMMA polymers having a high content of syndiotactic triads, a number average molecular weight ranging from 5,000 to 500,000 and a polydispersity index ranging from 1.01 to 1.5, are prepared by anionically polymerizing methyl methacrylate, characteristically at a temperature of at least 0° C., in the presence of (a) at least one organolithium or organosodium initiator and (b) at least one $AlR^1R^2R^3$ ligand, for example at least one di- or tri-phenoxy alkyl aluminum compound.

12 Claims, No Drawings

HIGHLY SYNDIOTACTIC PMMA POLYMERS

BACKGROUND OF THE INVENTION

1. Technical Field of the Invention

The present invention relates to the preparation, via anionic polymerization, of polymethyl methacrylate ("PMMA") polymers having a relatively high content of syndiotactic triads, such high content of syndiotactic triads therein imparting to the final polymers a higher glass transition temperature and, therefore, greater resistance to heat.

2. Description of the Prior Art

It is known to this art to prepare polymethyl methacrylate via a free-radical technique. However, the polymers obtained have glass transition temperatures in the range of 100° to 110° C., which corresponds to contents of syndiotactic triads in the range of 60% to 65%.

These polymers have also been prepared by the anionic technique in the presence of an initiator system comprising an initiator and a ligand. The presence of a ligand is generally necessary to prevent side reactions due to the attack, by the anions, of the ester groups of the methyl methacrylate monomer.

Organic compounds of aluminum are efficient ligands, used in combination with conventional organolithium initiators, to promote the anionic polymerization of methyl methacrylate in toluene. Exemplary of these ligand compounds are the trialkyl aluminums and the dialkyl phenoxy aluminums.

Ligands of the $AlR_3$ type (R=unhindered alkyl) have long been employed to prepare a highly syndiotactic polymethyl methacrylate. For example, Hatada et al, Makromol. Chem., Suppl. 15, 167 (1989), report that an initiator system tBuLi/$Et_3Al$ (mole ratio initiator/ligand greater than ⅓) produces a polymethyl methacrylate having over 90% of syndiotactic triads, in toluene at –78° C. The drawback of the ligands of this type is that the polymerization must be carried out at very low temperature.

$R_3Al$ ligands have also been used, but containing bulky R moieties (such as di- or tri-isobutyl), requiring polymerization temperatures of about 0° C. The polymers thus obtained, described in EP-A-0,434,316 exhibit, in particular, a value of Tg in the range of 112° C. to 119° C., indicating a syndiotacticity approaching that of the free-radical polymethyl methacrylate, i.e., contents of syndiotactic triads on the order of 60% to 65%.

Haddleton et al, Polymer Preprints, 34, 564–565 (1993), describe a syndiotacticity of polymethyl methacrylate in the range of 33% to 67% employing a tBuLi/tri-isobutyl aluminum system at ambient temperature.

SUMMARY OF THE INVENTION

Accordingly, a major object of the present invention is the provision of an improved process for the polymerization of methyl methacrylate that can be carried out at temperatures of at least 0° C., namely, under industrial scale conditions, and providing a polymer having a relatively high content of syndiotactic triads.

Another object of the present invention is the provision of an improved process for the preparation of PMMA polymers, the polymolecularity (or polydispersity) of which being better controlled and the initiator thereof being more efficient at the temperatures of reaction, and in particular at about 20° C. (ambient temperature).

Briefly, the present invention features a process for the preparation of a polymethyl methacrylate having a content of syndiotactic triads of at least 70%, and advantageously greater than 75%, comprising the anionic polymerization of methyl methacrylate in the presence of an initiator system which comprises an organolithium or organosodium initiator and a ligand, said ligand including at least one compound of formula (I):

in which $R^1$ and $R^2$, which may be identical or different, are each a substituted or unsubstituted phenoxy radical, and $R^3$ is a substituted or unsubstituted alkyl radical, or a substituted or unsubstituted phenoxy radical.

DETAILED DESCRIPTION OF BEST MODE AND PREFERRED EMBODIMENTS OF THE INVENTION

More particularly according to the present invention, the initiator and ligand are characteristically intimately admixed in a reaction vessel at a temperature, of at least 0° C., prior to adding the methyl methacrylate monomer thereto.

In formula (I), the alkyl radicals $R^3$ are preferably $C_1$ to $C_6$ alkyl radicals, such as methyl, ethyl and isobutyl.

The optional substituents borne by the phenoxy radicals $R_1$, $R_2$ and $R_3$ are preferably alkyl radicals $R_3$ and other inert moieties such as aryl.

Thus, it has now unexpectedly and surprisingly been determined that using a di- or tri-phenoxy aluminum ligand, methyl methacrylate is anionically polymerized, in a solvent medium, at temperatures of 0° C. and above, to produce a polymethyl methacrylate, generally with quantitative conversion, having a narrow molecular weight distribution (polymolecularity) and a syndiotacticity greater than 70% and, in particular, greater than that previously obtained at the same polymerization temperature.

Furthermore, it is no longer required to formulate the ligand/initiator mixture at a very low temperature, heretofore generally about –78° C., to avoid the side reactions which diminish the initiator efficiently and increase the polymolecularity index. To the contrary, the ligand/initiator mixture according to the invention can be prepared at a temperature up to 20° C., and well beyond, without presenting any particular problem.

The ligand/initiator system according to the invention therefore permits the synthesis of polymethyl methacrylate having a high content of syndiotactic triads under more favorable conditions, while maintaining satisfactory efficiency and good control of the molecular weight and of the polymolecularity of the final polymer.

Preferred ligands according to the invention include di-(2,6-di-tert-butylphenoxy)ethyl (or methyl or isobutyl) aluminum and tri-(2,6-di-tert-butylphenoxy) aluminum.

The compounds of formula (I) are per se known to this art and are typically prepared by reacting phenols with $AlR_3$ compounds (R=alkyl).

According to the present invention, the polymerization is advantageously carried out at a temperature of at least 0° C., for example ranging from 0° to 60° C.

The initiator is preferably a compound of formula (II):

in which $R^4$ is a linear or branched alkyl radical having from 2 to 6 carbons atoms, an optionally substituted, monocyclic or polycyclic aryl radical, a $C_2$ to $C_6$ alkenyl radical optionally substituted by an aryl or alkylaryl radical, or a linear or branched alkyl radical having from 1 to 6 carbons atoms and substituted by at least one phenyl radical, and M is an atom of an alkali metal, such as lithium or sodium.

Particularly exemplary initiators include sec-butyl lithium, n-butyl lithium, tert-butyl lithium, fluorenyl lithium, alpha-methylstyryl lithium, 1,1-diphenylhexyl lithium, diphenylmethyl lithium and 1,1-diphenyl-3-methylpentyl lithium.

The mole ratio of ligand to initiator in the initiator system of the invention may vary over wide limits. The amount of ligand can, for example, be greatly in excess of the amount of initiator. This amount can also be equal to or less than the amount of initiator. Preferably, a molar ratio of ligand to initiator of at least 1 is employed, even up to 50, for example from 1 to 5.

The polymerization time depends, in particular, on the concentration of monomer and of initiator, and on the polymerization temperature.

Furthermore, the polymerization according to the invention is carried out in the absence of moisture and oxygen, and in the presence or absence of a solvent. The solvent is advantageously selected from among the apolar solvents, such as benzene, ethylbenzene and toluene.

The polymethyl methacrylate final products according to the invention have a number average molecular weight ranging from 5,000 to 500,000, a polydispersity index $\overline{Mw}/\overline{Mn}$ generally ranging from 1.01 to 1.5, advantageously from 1.01 to 1.2. Their content of syndiotactic triads generally ranges from 70% to 90%.

To obtain the polymethyl methacrylate from the living methyl methacrylate, the latter is deactivated by reacting same with a proton source, in particular with an alcohol or an acid.

The process according to the invention can be carried out to prepare polymers of methyl methacrylate well suited for any application requiring polymers exhibiting good mechanical strength and high heat resistance, while maintaining good transparency.

Furthermore, the living polymethyl methacrylate of the invention can be employed in anionic sequence copolymerization to produce block copolymers comprising at least one block based on said polymethyl methacrylate and one or more blocks, whether identical or different, each based on a polymer other than the polymethyl methacrylate. The monomers for this or these additional blocks can be selected from among the methacrylic, vinylaromatic, dienic and maleimide (co)monomers.

In order to further illustrate the present invention and the advantages thereof, the following specific examples are given, it being understood that same are intended only as illustrative and in nowise limitative.

In said examples to follow, the abbreviations employed are:

| Me | methyl |
| Et | ethyl |
| iBu | isobutyl |
| Ar | 2,6-di-tert-butyl phenyl |
| tBuLi | tert-butyl lithium |
| sBuLi | sec-butyl lithium |
| nBuLi | n-butyl lithium |
| DPHLi | 1,1-diphenylhexyl lithium |
| EIBLi | ethyl a-lithioisobutyrate |
| MMA | methyl methacrylate |

EXAMPLES

Preparation of ligands $R_{3-x}Al(OAr)_x$ wherein R= Me, Et or iBu, and x=1, 2 or 3

General Procedure

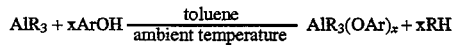

Prior to use, the ArOH was purified by sublimation, and the toluene was first boiled under reflux on $CaH_2$ for 24 h, and then dried on $PSt^-Li^+$.

The ArOH was first introduced into a previously flame-sterilized flask, equipped with a stirring rod. The toluene was transferred into the reactor by means of a stainless steel capillary. After the solution had been cooled to −30° C., the desired amount of $AlR_3$ (excess of 5% in each instance) was slowly added. The reaction temperature was then slowly increased to ambient temperature (about 20° C.) or 40° C., according to the desired final compounds. The solution could be stored for more than 12 h at this temperature.

EXAMPLE 1

Preparation of di (2,6-di-tert-butylphenoxy) methyl aluminum 9.5 g ($4.5 \times 10^{-2}$ mol) of 2,6-di-tert-butylphenol were introduced into a previously flame-sterilized flask. 13 ml of toluene were then transferred into the reactor through a stainless steel capillary. After the solution had been cooled to −30° C., 10 ml of $AlMe_3$ (2.3 mol/l in heptane) were added to the flask during 20 min at −30° C. The reaction temperature was then slowly increased to 20° C. The reaction continued at this temperature overnight.

EXAMPLE 2

Polymerization of MMA in toluene at 20° C. with tBuLi as initiator and di-(2,6-di-tert-butylphenoxy) ethyl aluminum as ligand 2 ml of a 0.5 mol/l solution of di-(2,6-di-tert-butylphenoxy)ethyl aluminum were introduced using a syringe into a previously flame-sterilized flask. After the removal of the solvent by pumping, 50 ml of freshly-dried toluene (dried on $PSt^{-Li+}$) were introduced into the flask using a stainless steel capillary. At ambient temperature (about 20° C.), 1 ml of tBuLi (0.18 mol/l) was added to the above solution and was mixed with the ligand for 10 min, at this temperature. At the same temperature, 2.0 ml of MMA then added and polymerized for 2 h. The final product was recoved by precipitation of the polymerization solution in heptane and dried at 60° C. under a vacuum for 48 h. As a result, 1.80 g of PMMA (96% yield) was obtained.

Characterization of the PMMA obtained

Steric exclusion chromatography (SEC) was carried out using a Hewlett Packard 1090 liquid chromatograph equipped with four columns ($10^5$, $10^3$, 500 and 100 Å) and a Hewlett Packard 1037A refractive index detector. The following results were obtained:

| $\overline{Mn}_{SEC}$ | 26,100 |
|---|---|
| Mw/Mn | 1.14 |
| $\overline{Mn}_{calculated}$ | 10,400 |

$\overline{Mn}_{calculated}$=conversion×weight of monomer (g)/$C_{initiator}$ (mol)

f=efficiency of initiator=$\overline{Mn}_{calculated}/\overline{Mn}_{SEC}$=0.40

The analyses of the microstructure of the polymers were carried out using $^1$H NMR:

(a) Syndiotactic triads (S): 77%
(b) Heterotactic triads (H): 22%
(c) Isotactic triads (I): 1%

EXAMPLE 3 (Comparative)

Polymerization of MMA in toluene at 20° C. using tBuLi as initiator and (2,6-di-tert-butylphenoxy) diethyl ammonium as ligand The procedure of Example 2 was repeated. The yield was 50% and the characteristics of the PMMA were as follows (obtained under the same conditions as in Example 2):

| $\overline{Mn}_{SEC}$ | 24,800 |
|---|---|
| Mw/Mn | 1.28 |
| $\overline{Mn}_{calculated}$ | 5,600 (initiator efficiency 0.23) |
| Syndiotactic triads (S) | 68% |
| Heterotactic triads (H) | 32% |
| Isotactic triads (I) | 0% |

Other anionic polymerizations of MMA in toluene were carried out by varying the type of initiator, the type of ligand, the mole ratio ligand/initiator, the polymerization temperature, and the polymerization time.

EXAMPLES 4–27

In these examples, the initiator and ligand were mixed at 0° C. for 30 min. The temperatures set forth in the Table below correspond to the polymerization temperatures.

The results, obtained under the same conditions as indicated above, are reported in the following Table:

TABLE

| | Initiator system | | | | | | Con- | | | | | | | |
|---|---|---|---|---|---|---|---|---|---|---|---|---|---|---|
| | | Ligand $R_{3-x}Al(OAr)_x$ | | Mole ratio ligand/ | Temp. | Time | version (wt | $\overline{Mn}$ | | | | | | |
| Example | Initiator | R | X | initiator | (°C.) | (h) | %) | calculated | $\overline{Mn}_{SEC}$ | Mw/Mn | f | S | H | I |
| 3 (comparative) | tBuLi | Et | 1 | 5/1 | 20 | 2 | 50 | 5 600 | 24 800 | 1.28 | 0.23 | 68.1 | 31.7 | 0.2 |
| 2 | tBuLi | Et | 2 | 5/1 | 20 | 3 | 97 | 10 000 | 26 100 | 1.14 | 0.38 | 76.9 | 22.3 | 0.8 |
| 4 (comparative) | tBuLi | Et | 1 | 5/1 | 0 | 1.5 | 100 | 12 200 | 25 300 | 1.11 | 0.48 | 75.7 | 24.0 | 0.3 |
| 5 | tBuLi | Et | 2 | 5/1 | 0 | 3 | 71 | 11 100 | 24 100 | 1.07 | 0.46 | 80.0 | — | — |
| 6 (comparative) | tBuLi | Et | 1 | 5/1 | 20 | 2 | 100 | 16 600 | 31 500 | 1.37 | 0.51 | 69.2 | 27.7 | 3.1 |
| 7 | tBuLi | Et | 2 | 5/1 | 20 | 4 | 95 | 12 800 | 28 600 | 1.16 | 0.45 | 79.4 | 20.1 | 0.5 |
| 8 | tBuLi | Et | 2 | 5/1 | 22 | 2 | 97 | 17 200 | 27 100 | 1.13 | 0.63 | 78.7 | 20.8 | 0.5 |
| 9 | tBuLi | None | 3 | 5/1 | 40 | 2 | 35 | 4 400 | 26 900 | 1.14 | 0.16 | 72.6 | 25.8 | 1.6 |
| 10 (comparative) | tBuLi | Me | 1 | 5/1 | 20 | 1 | 80 | 9 400 | 51 600 | 1.76 | 0.18 | 60.5 | 37.2 | 2.3 |
| 11 | tBuLi | Me | 2 | 5/1 | 20 | 1 | 83 | 10 600 | 25 500 | 1.09 | 0.42 | 80.5 | — | — |
| 12 (comparative) | sBuLi | Et | 1 | 5/1 | 20 | 2 | 55 | 5 600 | 33 300 | 1.93 | 0.17 | 62 | 36.8 | 1.2 |
| 13 | sBuLi | Et | 2 | 5/1 | 20 | 2 | 78 | 7 800 | 45 100 | 1.82 | 0.17 | 70.6 | 27.7 | 1.7 |
| 14 (comparative) | nBuLi | Et | 1 | 5/1 | 20 | 2 | 100 | 12 500 | 70 700 | 2.61 | 0.18 | 60.1 | 35.8 | 4.1 |
| 15 | nBuLi | Et | 2 | 5/1 | 20 | 3 | 100 | 11 000 | 59 600 | 1.54 | 0.18 | 70.7 | 25.7 | 3.6 |
| 16 (comparative) | EIBLi | iBu | 0 | 5/1 | 20 | 2 | 65 | 13 000 | 36 100 | 1.25 | 0.36 | 55 | 35 | 10 |
| 17* | EIBLi | Me | 2 | 5/1 | 20 | 2 | 100 | 23 000 | 75 700 | 1.15 | 0.30 | 74.0 | 24 | 2 |
| 18 (comparative) | DPHLi | Me | 1 | 4/1 | 0 | 4 | 43 | 6 670 | 81 300 | 3.75** | 0.10 | 67.2 | 28.7 | 4.1 |
| 19 (comparative) | DPHLi | Me | 1 | 4/4 | 20 | 4 | 70.5 | 11 000 | 88 600 | 3.95** | 0.12 | 62.0 | 31.7 | 6.3 |
| 20 | DPHLi | Me | 2 | 4/1 | 0 | 4 | 100 | 27 000 | 129 800 | 1.12 | 0.21 | 76.7 | 21.4 | 1.9 |
| 21 | DPHLi | Me | 2 | 4/1 | 20 | 4.5 | 53 | 12 500 | 120 400 | 1.26 | 0.10 | 72.2 | 25.1 | 2.7 |
| 22 | DPHLi | Me | 2 | 5/1 | 20 | 5 | 72 | 16 500 | 361 200 | 1.42 | 0.05 | — | — | — |
| 23 (comparative) | DPHLi | 1Bu | 1 | 5/1 | 0 | 5 | 41 | 4 100 | 79 000 | 1.89 | 0.05 | 55.5 | 34.0 | 9.5 |
| 24 | DPHLi | iBu | 2 | 5/1 | 0 | 5 | 90 | 8 300 | 20 500 | 1.40 | 0.40 | 80.6 | 18.3 | 1.1 |
| 25 | DPHLi | None | 3 | 4/1 | 0 | 3 | 90 | 13 500 | 36 300 | 1.15 | 0.37 | 71.6 | 26.5 | 1.9 |

TABLE-continued

| | Initiator system | | | | | | Con- | | | | | | | |
|---|---|---|---|---|---|---|---|---|---|---|---|---|---|---|
| | | Ligand $R_{3-x}Al(OAr)_x$ | | Mole ratio ligand/ | Temp. | Time | ver- sion (wt | $\bar{Mn}$ | | | | | | |
| Example | Initiator | R | X | initiator | (°C.) | (h) | %) | calculated | $\bar{Mn}_{SEC}$ | $\bar{Mw}/\bar{Mn}$ | f | S | H | I |
| 26 | DPHLi | None | 3 | 4/1 | 20 | 3 | 100 | 15 500 | 59 900 | 1.16 | 0.26 | 72.8 | 26.5 | 0.7 |
| 27 | DPHLi | None | 3 | 4/1 | 40 | 3 | 57 | 13 500 | 37 700 | 1.70 | 0.36 | 73.8 | 23.2 | 3.0 |

*: Monomer concentration = 5% by weight
**: Bimodal

Based on the above examples, it was observed that, at the same polymerization temperature, the polymolecularity and the tacticity (syndiotactic triads) of the polymers obtained according to the invention were improved in comparison with those of the comparative examples.

It was also observed that the increase in the mixing temperature of the initiator and ligand, from 0° C. to 20° C., did not significantly alter the polymolecularity and the tacticity (syndiotactic triads) of the polymers.

It will be appreciated that, if the DPHLi is complexed with four molar equivalents of di-(2,6-di-tert-butylphenoxy) methyl aluminum at 0° C., the anionic polymerization of MMA produced a product having a very high molecular weight (higher than $10^5$) and a very narrow molecular weight distribution (about 1.12).

It was also determined that the mixture of 1,1-diphenylhexyl lithium (DPHLi) and the ligand of the $AlR_2(OAr)$ type (with R=alkyl and Ar=phenyl, optionally substituted) (ligand not included in the invention) was colorless to yellow, indicating a strong coordination between the initiator and the aluminum, while the mixture of DPHLi and $AlR(OAr)_2$ was red, indicating weak coordination. The result is that the complexes formed were different in both cases, that obtained according to the invention being more stable at the temperatures considered.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of a polymethyl methacrylate polymer having an at least 70% content of syndiotactic triads, comprising anionically polymerizing methyl methacrylate in the presence of (a) at least one organolithium or organosodium initiator and (b) at least one ligand having the formula (I):

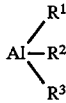

(I)

in which the radicals $R^1$ and $R^2$, which may be identical or different, are each a substituted or unsubstituted phenoxy radical, and $R^3$ is a substituted or unsubtituted alkyl radical, or a substituted or unsubtituted phenoxy radical.

2. The process as defined by claim 1, carried out at a temperature of at least 0° C.

3. The process as defined by claim 2, comprising intimately admixing said at least one initiator (a) and said at least one ligand (b) at a temperature of at least 0° C., and then adding methyl methacrylate monomer thereto.

4. The process as defined by claim 2, carried out at a temperature ranging from 0° C. to 60° C.

5. The process as defined by claim 1, said at least one ligand (b) comprising di-(2,6-di-tert-butylphenoxy)ethyl aluminum, di-(2,6-di-tert-butylphenoxy)methyl aluminum or di-(2,6-di-tert-butylphenoxy)isobutyl aluminum.

6. The process as defined by claim 1, said at least one ligand (b) comprising tri-(2,6-di-tert-butylphenoxy) aluminum.

7. The process as defined by claim 1, said at least one initiator (a) having the formula (II):

$$R^4-M \qquad (II)$$

in which $R^4$ is a linear or branched alkyl radical having from 2 to 6 carbons atoms, an optionally substituted, monocyclic or polycyclic aryl radical, a $C_2$ to $C_6$ alkenyl radical optionally substituted by an aryl or alkylaryl radical, or a linear or branched alkyl radical having from 1 to 6 carbons atoms and substituted by at least one phenyl radical, and M is an atom of an alkali metal.

8. The process as defined by claim 6, said at least one initiator (a) comprising sec-butyl lithium, n-butyl lithium, tert-butyl lithium, fluorenyl lithium, alpha-methylstyryl lithium, 1,1-diphenylhexyl lithium, diphenylmethyl lithium or 1,1-diphenyl-3-methylpentyl lithium.

9. The process as defined by claim 1, wherein the molar ratio of ligand to initiator ranges from 1 to 50.

10. The process as defined by claim 1, carried out in the absence of moisture and oxygen.

11. The process as defined by claim 1, carried out in an apolar reaction solvent.

12. The process as defined by claim 1, said reaction solvent comprising benzene, toluene or ethylbenzene.

\* \* \* \* \*